United States Patent
Matsuda et al.

(10) Patent No.: US 8,715,805 B2
(45) Date of Patent: May 6, 2014

(54) OPTICAL RECORDING MEDIUM

(71) Applicant: Taiyo Yuden Co., Ltd., Tokyo (JP)

(72) Inventors: Isao Matsuda, Takasaki (JP); Takaki Hamamoto, Takasaki (JP); Takuo Kodaira, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/748,395

(22) Filed: Jan. 23, 2013

(65) Prior Publication Data

US 2013/0189544 A1    Jul. 25, 2013

(30) Foreign Application Priority Data

Jan. 24, 2012  (JP) ................................. 2012-012359

(51) Int. Cl.
- *G11B 7/24* (2013.01)
- *G11B 7/246* (2013.01)
- *G11B 7/2467* (2013.01)

(52) U.S. Cl.
CPC .............. *G11B 7/246* (2013.01); *G11B 7/2467* (2013.01)
USPC .... 428/64.1; 428/64.4; 428/64.8; 430/270.14

(58) Field of Classification Search
CPC .............................. G11B 7/246; G11B 7/2467
USPC ...................................... 428/64.4; 430/270.14
See application file for complete search history.

(56) References Cited

U.S. PATENT DOCUMENTS

| | | |
|---|---|---|
| 2008/0081285 A1 | 4/2008 | Watanabe et al. |
| 2009/0022044 A1 | 1/2009 | Sakamoto et al. |
| 2009/0252013 A1 | 10/2009 | Nakamura et al. |
| 2010/0002569 A1 | 1/2010 | Nagase et al. |
| 2010/0074094 A1 | 3/2010 | Sakamoto et al. |
| 2011/0129635 A1 | 6/2011 | Kodaira et al. |
| 2011/0202942 A1 | 8/2011 | Fujimoto et al. |
| 2011/0244164 A1 | 10/2011 | Somei et al. |

FOREIGN PATENT DOCUMENTS

| | | |
|---|---|---|
| EP | 1903561 A1 | 3/2008 |
| EP | 1967378 A1 | 9/2008 |
| JP | 2005-196940 A | 7/2005 |
| JP | 2007-045147 A | 2/2007 |
| JP | 2007-196661 A | 8/2007 |
| JP | 2007-335061 A | 12/2007 |
| JP | 2008-117470 A | 5/2008 |
| JP | 2010-033639 A | 2/2010 |
| JP | 2010-143184 A | 7/2010 |
| TW | 200817326 A | 4/2008 |

*Primary Examiner* — Elizabeth Mulvaney
(74) *Attorney, Agent, or Firm* — Law Office of Katsuhiro Arai

(57) ABSTRACT

An object of the present invention is to provide a recordable recording medium that suppresses increase in terminal noise and does not generate a BCA signal read error. The present invention provides a recordable optical recording medium comprising a substrate as well as at least a reflection layer, recording layer and light transmission layer provided on the substrate, wherein the recording layer of said optical recording medium contains (a) an azo metal complex dye and (b) another dye whose DSC decomposition heat value is 50 cal/g to 200 cal/g and λmax in TFP solution is 250 to 400 nm.

14 Claims, 2 Drawing Sheets

IH
IS
GN

IH
Slice level
25%
IN
100
75%
GN

OPTICAL RECORDING MEDIUM

BACKGROUND

1. Field of the Invention

The present invention relates to an optical recording medium that records and plays back information in response to blue laser (of 300 to 500 nm in wavelength) and has a recording layer containing organic dye.

2. Description of the Related Art

Optical discs and other optical information recording media are becoming popular as information recording media. Some of these optical information recording media have a reflection layer and recording layer formed, on top of each other, on a light transmission resin substrate of 1.2 mm in thickness and 120 mm or 80 mm in diameter, such as recordable compact discs (CD-Rs). These optical recording media record data by forming recording marks in their recording layer in response to irradiation of a recording laser beam. To achieve even higher information recording density, other methods have been devised whereby the laser wavelength is shortened and an objective lens of large NA (Numerical Aperture) is used, which are embodied in recordable digital versatile discs (DVD±Rs) and other similar optical information recording media. DVD±Rs are structured in such a way that two light-transmission resin substrates of 0.6 mm thickness are bonded together, with a reflection layer and recording layer sandwiched between these substrates, in order to increase the allowable tilt of the disc that must be angled due to its shorter wavelength and higher NA. In recent years, higher information recording density is further required to record high-definition image data. To meet this requirement, recordable Blu-ray discs (BD-R: Blu-ray Disc is a registered trademark) and other similar optical information recording media have emerged, which are structured in such a way that a reflection layer and recording layer are formed on the light-entering side of a resin substrate of 1.1 mm in thickness, with a light-transmission cover layer (light transmission layer) provided on the side where the reflection layer and recording layer are formed.

With these optical information recording media, serial number, lot number, and other management information are bar-coded and recorded on each optical disc so that whether or not it is a genuine optical disc manufactured or sold by the specified manufacturer or distributor can be identified using this management information. To be specific, a burst cutting area (hereinafter referred to as "BCA") is provided on the innermost periphery side of the area over which the recording layer of the optical disc is formed, and a barcode-shaped mark (hereinafter referred to as "BCA Mark") is recorded in the recording layer inside this area, to allow for identification of the optical disc by reading the BCA mark using an optical head equipped on any drive designed to play back optical discs. Even a part of the BCA mark is used to prevent illegal copying of information. Accordingly, the BCA mark is an important and essential aspect of optical discs.

To improve the BCA cutting quality on optical discs, ingenious ways have been devised to improve the quality of the BCA when it is cut, including the (1) technology whereby, in a medium having two or more recording layers, the heat conductivity of the material constituting other layer(s) is adjusted to at least 1.5 times the heat conductivity of the material constituting the information recording layer where the BCA mark is to be processed, in order to facilitate heat diffusion in the information recording layer and prevent processing marks from remaining in the layer that should not be damaged (Japanese Patent Laid-open No. 2005-196940) and (2) technology whereby a reflective film is provided using Ag as the main constituent and Gd as a trace additive, to allow more laser marking beam to be absorbed and thereby improve the recording characteristics of the BCA (Japanese Patent Laid-open Nos. 2007-335061 and 2008-117470), etc. It should be noted that all of these technologies are designed to improve the BCA cutting quality on optical disc media whose recording layer is made of inorganic material.

PRIOR ART LITERATURES

Patent Literatures

[Patent Literature 1] Japanese Patent Laid-open No. 2005-196940

[Patent Literature 2] Japanese Patent Laid-open No. 2007-335061

[Patent Literature 3] Japanese Patent Laid-open No. 2008-117470

SUMMARY

On an optical disc media whose recording layer contains organic dye, BCA cutting is implemented with a mechanism whereby the dye absorbs the irradiated laser beam and generates heat, and this heat is used to melt and burn off the reflective film, to achieve appropriate signal quality (degree of modulation (IS/IH) of 0.5 or less (refer to FIG. 1)). If excessive heat is generated when cutting, however, thermal interference occurs between barcode bars and the ends of the barcode are damaged. For this reason, it is important to optimally control the quantity of irradiated light and heat generation (heat storage, thermal stress) when cutting.

In the case of organic-dye recording media having a cover layer of two-layer structure (the number of layers excludes a hardcoat layer), where one of the two layers is a low-elastic layer that permits deformation, the heat generated at the time of BCA cutting, and resulting thermal stress, can be absorbed by (deformation of) the low-elastic layer. In the case of organic-dye recording media without this low-elastic layer, or specifically having a cover layer of one-layer structure, on the other hand, there is no layer that (deforms and thereby) absorbs the heat generated at the time of BCA cutting, and resulting thermal stress, and therefore the ends (terminal areas) of the barcode are damaged by the reflective film material and dye material that has melted in the dye layer, which in turn generates signal noise in the dark defect mode (terminal noise IN (refer to FIG. 2)). Specifically, when insufficient decomposition heat is generated as a result of optical absorption by the dye at the time of BCA cutting, greater cutting power (irradiated laser beam) must be added to ensure the required degree of modulation, in which case excessive energy causes thermal interference to occur between barcode bars. As a result, terminal noise increases and this noise leaks into the BCA signal, causing a read error (when the IH level is defined as 100% and slice level at the time of binary conversion is set to 75%, binary conversion will become abnormal when the terminal noise becomes 25% or more and an error will occur (refer to FIG. 2)). An object of the present invention is to provide a recordable recording medium that suppresses such increase in terminal noise and does not generate a BCA signal read error.

The present invention is a recordable optical recording medium comprising a substrate as well as at least a reflection layer, recording layer, and light transmission layer provided on the substrate, wherein the recording layer of said optical recording medium contains (a) an azo metal complex dye and (b) another dye whose DSC decomposition heat value is 50 cal/g to 200 cal/g and λmax in TFP solution is 250 to 400 nm. In some embodiments, a dye comprises, consists essentially of, or consists of dyes (a) and (b), wherein dye (a) is a major dye, and dye (b) is a second major dye. In some embodiments, dye (a) has a DSC decomposition heat value outside a range of 50 cal/g to 200 cal/g, and/or has a λmax in TFP solution outside a range of 250 to 400 nm. In some embodiments, dye (b) is an azo metal complex dye or alternatively a non-azo dye. Dye (a) and dye (b) may each be constituted by one or more dyes.

According to the present invention, a recordable optical recording medium whose IS/IH is 0.5 or less and terminal noise is less than 25% can be provided, to prevent a BCA signal read error.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features, and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

Figure 1:
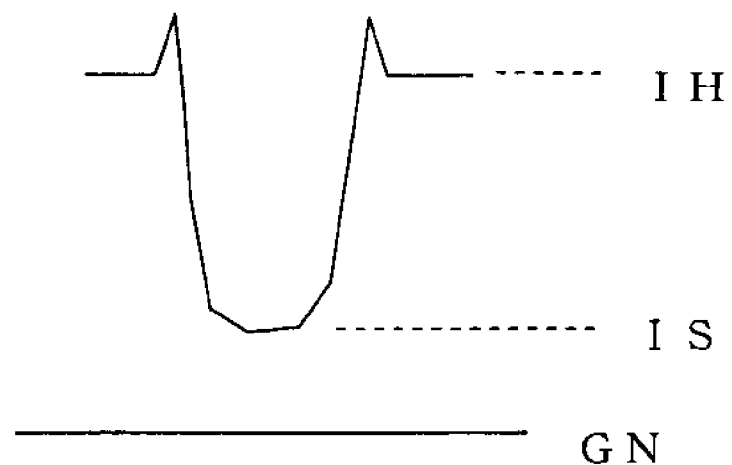
FIG. 1 is a profile of reflected light, which is regenerated light, from a BCA mark
Figure 2:
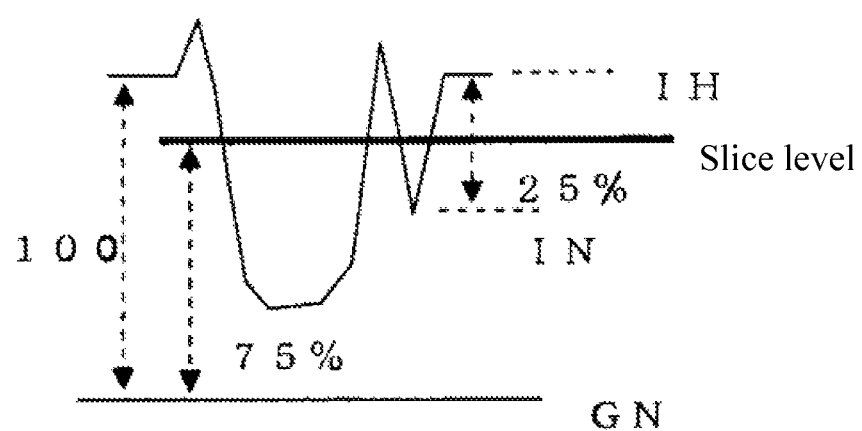
FIG. 2 is a profile of reflected light, which is regenerated light, from a BCA mark when terminal noise has increased

The recordable optical recording medium proposed by the present invention comprises a substrate as well as at least a reflection layer, recording layer, and light transmission layer provided on the substrate, wherein the recording layer of said optical recording medium contains (a) an azo metal complex dye and (b) another dye whose DSC decomposition heat value is 50 cal/g to 200 cal/g and λmax in TFP solution is 250 to 400 nm.

The substrate functions as a support that ensures the mechanical strength required of an optical recording medium, being a disc of approx. 1.1 mm in thickness and 120 mm in diameter. The material with which to form the substrate is not limited in any way, as long as the mechanical strength required of an optical recording medium can be ensured, and examples include aluminum and other metals, glass, ceramics, resins, and the like. Among these, resins, especially thermoplastic resins, can be used favorably from the viewpoints of moldability, moisture resistance, dimensional stability, cost, etc. Examples of substrates which form resin include, among others, polycarbonate resins; polymethyl methacrylate and other acrylic resins; polyvinyl chloride, vinyl chloride copolymers and other vinyl chloride resins; epoxy resins; amorphous polyolefin resins; and polyester resins. Among these, polycarbonate resins are particularly preferred.

The reflection layer functions to reflect toward the recording layer the laser beam that has been irradiated onto the optical recording medium and transmitted through the recording layer, and is normally formed with Ag alloy, Al alloy, or other metal of high reflectance. Examples of Ag alloy include AgPdCu, AgCuIn and AgBiNd, etc. Examples of Al alloy include AlNdTa, AlTi, etc. Preferably the reflection layer is formed with Ag alloy.

The recording layer is formed with an organic substance that contains organic dye. Preferably the (a) azo metal complex dye contained in the recording layer is an azo metal complex dye expressed by General Formula (1).

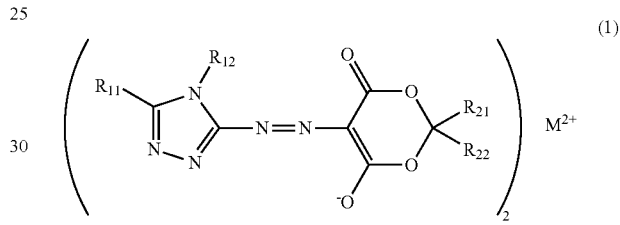

In General Formula (1), $R_{11}$ and $R_{12}$ are each an independent functional group selected from the group that includes a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms.

The alkyl group with 4 or less carbon atoms may be straight-chain or branched-chain alkyl or have a ring structure. Examples of the alkyl group with 4 or less carbon atoms include methyl group, ethyl group, n-propyl group, isopropyl group, n-butyl group, isobutyl group, sec-butyl group, t-butyl group, and the like.

Examples of the alkyl group with 4 or less carbon atoms being substituted by an aryl group with 6 to 10 carbon atoms include benzyl group, phenylethyl group, 1-naphthyl methyl group, and the like. The alkyl group may be straight-chain or branched-chain alkyl or have a ring structure.

The dialkyl amino group having identical or different alkyl groups with 4 or less carbon atoms may include dimethyl amino group, diethyl amino group, and the like. The alkyl group may be straight-chain or branched-chain alkyl or have a ring structure.

Examples of the halogen group include fluorine, chlorine and bromine, and the like.

Examples of the perfluoroalkyl group with 4 or less carbon atoms include trifluoromethyl group, pentafluoroethyl group, and the like. The alkyl group may be straight-chain or branched-chain alkyl or have a ring structure.

The alkoxy group with 4 or less carbon atoms may be straight-chain or branched-chain alkoxy or have a ring structure. Examples of the alkoxy group with 4 or less carbon atoms include methoxy group, ethoxy group, and the like.

Examples of the alkylthio group with 4 or less carbon atoms include methylthio group, ethyl thio group, and the like. The alkyl group may be straight-chain or branched-chain alkyl or have a ring structure.

Examples of the N,N-dialkyl carbamoyl group having identical or different alkyl groups with 4 or less carbon atoms include N,N-dimethyl carbamoyl group, N,N-diethyl carbamoyl group, and the like. The alkyl group may be straight-chain or branched-chain alkyl or have a ring structure.

In General Formula (1), $R_{21}$ and $R_{22}$ are each an independent alkyl group with 5 or less carbon atoms, or alternatively $R_{21}$ and $R_{22}$ can together form a 3 to 10-member ring.

Examples of the alkyl group with 5 or less carbon atoms include methyl group, ethyl group, n-propyl group, isopropyl group, n-butyl group, isobutyl group, sec-butyl group, t-butyl group, and the like. Examples of the ring formed by $R_{21}$ and $R_{22}$ together include cyclic alkyl group with 3 to 10 carbon atoms, and the like. Such cyclic group can have an alkyl group, carboxylic acid ethyl group or other substitution group with 3 or less carbon atoms. Examples of the cyclic alkyl group with 3 to 10 carbon atoms include cyclohexyl group, adamantyl group, and the like.

In General Formula (1), M represents a metal atom selected from the group that includes nickel, cobalt and copper, and preferably nickel.

Specific examples of the chemical compound expressed by General Formula (1) include the chemical compounds shown below.

TABLE 1

| | Molecular structure |
|---|---|
| Chemical Formula 11 | 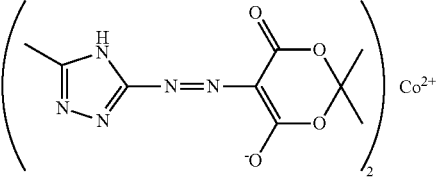 |
| Chemical Formula 12 | 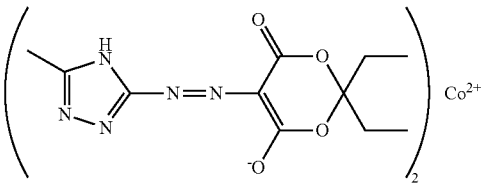 |
| Chemical Formula 13 | 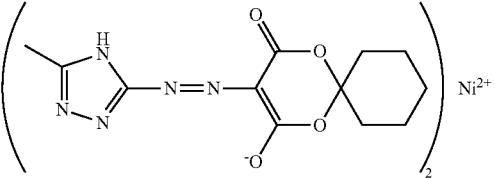 |
| Chemical Formula 14 | 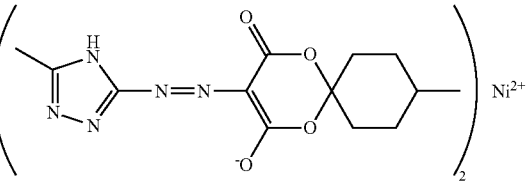 |
| Chemical Formula 15 | 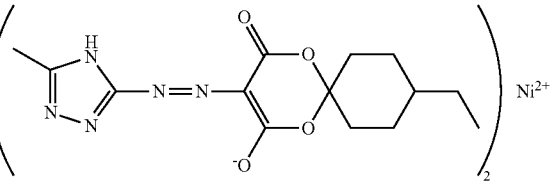 |
| Chemical Formula 16 | 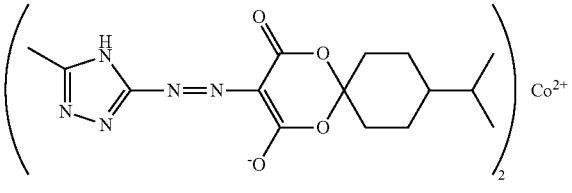 |

TABLE 1-continued

Molecular structure

Chemical Formula 17

$$\left( \underset{\text{[benzyl-triazole-azo-dioxaspiro structure]}}{} \right)_2 Ni^{2+}$$

Chemical Formula 18

$$\left( \underset{\text{[methylthio-triazole-azo-dioxaspiro structure]}}{} \right)_2 Ni^{2+}$$

Chemical Formula 19

$$\left( \underset{\text{[isopropyl-triazole-azo-dioxaspiro structure]}}{} \right)_2 Ni^{2+}$$

Chemical Formula 20

$$\left( \underset{\text{[methyl-triazole-azo-dioxaspiro structure]}}{} \right)_2 Ni^{2+}$$

Chemical Formula 21

$$\left( \underset{\text{[benzyl-methyl-triazole-azo-dioxaspiro structure]}}{} \right)_2 Ni^{2+}$$

The DSC decomposition heat value of dye (b) in the recording layer is 50 cal/g to 200 cal/g, and preferably 70 cal/g to 140 cal/g. If the decomposition heat value is insufficient, the IS level does not drop and an appropriate degree of modulation (IS/IH) may not be achieved. If excessive heat is generated, on the other hand, terminal noise may worsen. The λmax of dye (b) in TFP solution is 250 to 400 nm, and preferably 360 to 400 nm. The refractive index n of dye (b) is preferably 1.6 to 2.0, and more preferably 1.7 to 1.9. Furthermore, the absorption coefficient k of dye (b) is preferably 0.20 to 0.70, or more preferably 0.3 to 0.6. If n is low, or k is high, the refractive index (IH) drops and appropriate degree of modulation (IS/IH) may not be achieved. Preferably, dye (b) has optical properties equivalent to those of azo metal complex dye (a) so as not to impair the recording characteristics of azo metal complex dye (a). The content of dye (b) in the recording layer is 10 to 40 percent by weight, or preferably 15 to 30 percent by weight, relative to the weight of all organic dye in the recording layer.

For the material with which to form the light transmission layer, acrylic and other UV-hardening resins can be used, for example. Preferably the light transmission layer has a one-layer configuration. In addition, preferably the elastic modulus of the hardened light transmission layer at 25° C. is 40 MPa or more, but no more than 10000 MPa. The thickness of the light transmission layer is preferably 90 to 110 μm, or more preferably 95 to 105 μm. The light transmission rate of the light transmission layer, with respect to light of 405 nm in wavelength as measured by a spectrophotometer using light of 405 nm in wavelength, is preferably 70% or more, or more preferably 80% or more.

Preferably the recordable optical recording medium proposed by the present invention has a protection layer formed with dielectric material, between the recording layer and light transmission layer. When the light transmission layer is formed, the protection layer prevents the organic dye in the recording layer from diffusing to the light transmission layer, and also prevents mixing—a phenomenon of permeation into the recording layer of the solvent for photo-curing resin used when the light transmission layer is formed. The material with which to form the protection layer is not limited in any way, as long as it is a transparent dielectric material, where examples include oxides, nitrides, and sulfides of Zn, Zr, Si, Cr, Nb, Al, Sn, In, Ga, and the like, and the protection layer may be constituted by a material containing two or three types of the foregoing at varying composition ratios. The protection layer is formed by sputtering, etc. The thickness of the protection layer is preferably 10 to 50 nm, or more preferably 15 to 35 nm.

Preferably the recordable optical recording medium proposed by the present invention may have a hardcoat layer formed on the surface on the side opposite the one where the protection layer is formed. The hardcoat layer physically protects the light transmission layer and prevents the light transmission layer from being scratched. The material with which to form the hardcoat layer is not limited in any way, but materials offering excellent transparency and wear resistance are preferred. The hardcoat layer is formed by spin-coating a resin composition constituted by UV-hardening resin with inorganic grains added to it. The thickness of the hardcoat layer is preferably 1 to 5 μm, or more preferably 2 to 4 μm.

Figure 3:
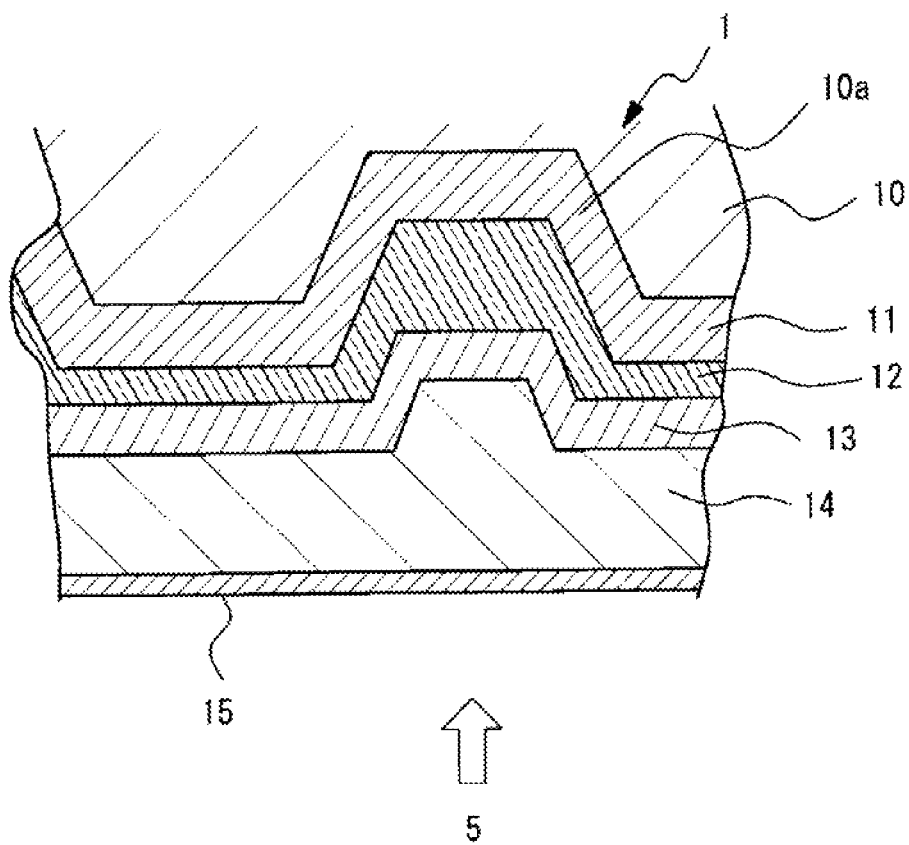
FIG. 3 is a schematic longitudinal cross-section view of a recordable optical recording medium pertaining to a favorable embodiment of the present invention

A recordable optical recording medium pertaining to a favorable embodiment of the present invention is explained using the schematic longitudinal cross-section view in FIG. 3. The recordable optical recording medium 1 has a substrate 10, and a reflection layer 11, recording layer 12, protection layer 13, light transmission layer 14 of one-layer configuration having optical transparency, and hardcoat layer 15, are layered in this order on the substrate 10. The configuration is such that the recording laser beam 5 for recording data in the recording layer 12 of the optical recording medium 1, and the playback laser beam 5 for playing back the data recorded in the recording layer 12, are irradiated onto the optical recording medium 1 through the surface of the hardcoat layer 15. Although not shown in FIG. 3, the recordable optical recording medium 1 has a disc shape and a center hole is formed at its center. Spiral guide grooves 10a are formed on the surface of the substrate 10. The spiral guide grooves 10a can be formed by, for example, injection-molding the substrate 10 using dies in which a stamper is set. The guide grooves 10a are formed at a pitch of 3.5 μm or 0.32 μm.

A reflection layer 11 is formed by means of sputtering, etc., on the surface of the substrate 10 on the side where the spiral guide grooves 10a are formed. A recording layer 12 is formed on the surface of the reflection layer 11. The recording layer 12 is formed by spin-coating the surface of the reflection layer 11 with an organic substance solution containing organic dye and then drying the solution. A protection layer 13 is formed on the surface of the recording layer 12. A light transmission layer 14 of one-layer configuration is formed on the surface of the protection layer 13. The light transmission layer 14 can be formed by, for example, spin-coating the surface of the protection layer 13 with a photo-curing resin solution that hardens when UV light or radiation is irradiated, and then irradiating UV light or radiation onto and thereby hardening the coating film thus formed. A hardcoat layer 15 that physically protects the light transmission layer 14 and prevents the light transmission layer 14 from being scratched, is formed on the surface of the light transmission layer 14.

When recording data to the optical recording medium 1 having such a configuration, laser beam 5 having a wavelength of 300 nm to 500 nm, particularly around 400 nm (such as 405 nm), is irradiated from the hardcoat layer 15 side. The laser beam 5 transmits through the hardcoat layer 15, light transmission layer 14 of one-layer configuration, and protection layer 13, and enters the recording layer 12. Or, it transmits through the recording layer 12, reflects on the reflection layer 11, and enters the recording layer 12. This decomposes the organic dye contained in the area of the recording layer 12 irradiated by the laser beam 5, and as the reflectance of this area rises, a recording pit is formed and data is written to the optical recording medium 1.

EXAMPLES (Organic Dyes Used in Examples and Comparative Examples)

The organic dyes used in Examples and Comparative Examples are shown in Tables 2 and 3 below.

TABLE 2

| | Molecular structure | λmax (TFP solution) [nm] | n | k | Decomposition heat value [cal/g] |
|---|---|---|---|---|---|
| Chemical Formula 31 | (structure with isoxazole–N=N–pyrimidinedione, Ni$^{2+}$) | 399 | 1.67 | 0.57 | 50 |
| Chemical Formula 32 | (structure with isoxazole–N=N–pyrimidinethione, Cu$^{2+}$) | 355 | 1.90 | 0.30 | 170 |

TABLE 2-continued

| | Molecular structure | λmax (TFP solution) [nm] | n | k | Decomposition heat value [cal/g] |
|---|---|---|---|---|---|
| Chemical Formula 33 | | 391 | 1.73 | 0.44 | 54 |
| Chemical Formula 34 | | 398 | 1.61 | 0.37 | 118 |
| Chemical Formula 35 | | 398 | 1.71 | 0.54 | 59 |
| Chemical Formula 36 | | 398 | 1.72 | 0.38 | 53 |
| Chemical Formula 43 | | 398 | 1.72 | 0.48 | 86 |
| Chemical Formula 38 | | 374 | 1.79 | 0.37 | 75 |
| Chemical Formula 39 | | 351 | 1.87 | 0.26 | 74 |

TABLE 2-continued
| Molecular structure | λmax (TFP solution) [nm] | n | k | Decomposition heat value [cal/g] |
|---|---|---|---|---|
| Chemical Formula 40 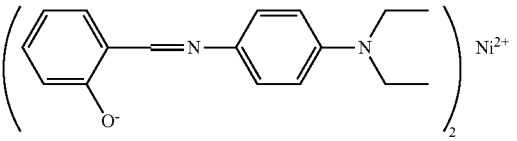 | 251 | 1.69 | 0.25 | 169 |
| Chemical Formula 41 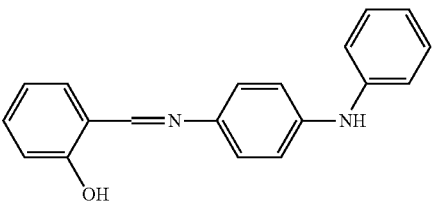 [SMILES: Oc1ccccc1C=Nc1ccc(Nc2ccccc2)cc1] | 372 | 1.72 | 0.20 | 112 |
| Chemical Formula 42 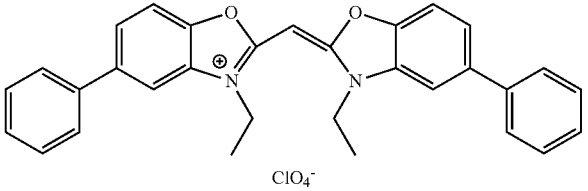 | 387 | 1.83 | 0.24 | 185 |
| Chemical Formula 43 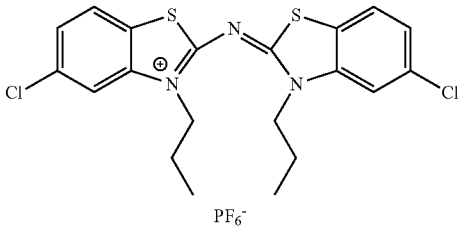 | 379 | 1.78 | 0.21 | 194 |
TABLE 3
| Molecular structure | λmax (TFP solution) [nm] | n | k | Decomposition heat value [cal/g] |
|---|---|---|---|---|
| Chemical Formula 51 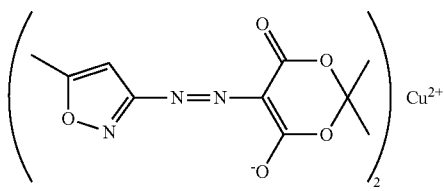 | 337 | 1.87 | 0.14 | 142 |
| Chemical Formula 52 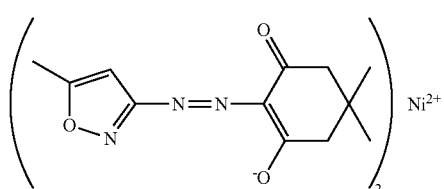 | 400 | 1.62 | 0.37 | 44 |

TABLE 3-continued

| | Molecular structure | λmax (TFP solution) [nm] | n | k | Decomposition heat value [cal/g] |
|---|---|---|---|---|---|
| Chemical Formula 53 | | 378 | 1.89 | 0.39 | 27 |
| Chemical Formula 54 | | 411 | 1.70 | 0.41 | 41 |
| Chemical Formula 55 | | 417 | 1.56 | 0.52 | 78 |
| Chemical Formula 56 | | 409 | 1.56 | 0.60 | 43 |
| Chemical Formula 57 | | 336 | 1.70 | 0.02 | −70 (Heat absorption and decomposition) |
| Chemical Formula 58 | | 380 | 1.77 | 0.23 | 324 |

(Measurement Method of λmax (TFP Solution))

A solution containing each dye dissolved in 2,2,3,3-tetrafluoro-1-propanol (TFP) to a concentration of approx. 30 μmol/L was prepared. This dye solution was placed in a quartz-glass cell of 1 cm in optical path length and measured using the spectrophotometer "U-4100" (brand name) manufactured by Hitachi High Technologies.

(Measurement Method of Refractive Index n and Absorption Coefficient k)

Each dye solution using TFP as the dissolving medium was spin-coated onto the top side of a disk-shaped polycarbonate substrate of 120 mm in outer diameter and 0.6 mm in thickness, being flat on both sides, after which the solution was dried at a temperature of 80° C. for 30 minutes to form a thin dye film of approx. 40 nm in film thickness, and then measurement was performed to obtain values of refractive index n and absorption coefficient k for 405 nm wavelength using "ETA-RT/UV" (brand name) manufactured by STEAG ETA Optik GmbH.

(Measurement Method of Decomposition Heat Value)

Measurement was performed using the DSC (differential scanning calorimetry) method. To be specific, approx. 2 mg of each organic dye, as weighed on a precision scale, was placed in an aluminum pan and used as a sample. Similarly, approx.

2 mg of alumina (Al$_2$O$_3$), as weighed on a precision scale, was placed in an aluminum pan and used as a reference. Nitrogen gas was introduced at a flow rate of 100 ml per minute, and the sample and reference were heated in this ambience at a rate of temperature rise of 10° C. per minute, to obtain the decomposition heat value from the peak area using the differential scanning calorimeter "DSC-3200S" (brand name) manufactured by MAC Science.

Example 1

A stamper designed to form grooves was installed in molding dies beforehand, and injection molding was performed using these molding dies to create a disk-shaped polycarbonate substrate of 120 mm in outer diameter and 1.1 mm in thickness, having a dedicated playback area (22.2 mm to 23.5 mm) consisting of convex-shaped grooves provided at a track pitch of 0.35 μm, as well as a data recording area (23.5 mm to 58.0 mm) consisting of convex-shaped grooves provided at a track pitch of 0.32 μm. On the substrate, a reflection layer constituted by Ag alloy (In ratio: 0.2 percent by weight) was formed to a thickness of 60 nm by means of sputtering.

Thereafter, 80 percent by weight of azo metal complex dye (main dye: Chemical Formula 11) and 20 percent by weight of organic dye (additive dye: Chemical Formula 31) were dissolved in TFP (2,2,3,3-tetrafluoro-l-propanol) solvent to prepare a dye solution. This dye solution was spin-coated onto the surface of the reflection layer, and the resulting coating film was dried at a temperature of 80° C. for 30 minutes to form a recording layer. The optical recording layer was formed, as a film, in such a way that its optical density (OD value) would become 0.24 at the maximum absorption wavelength (λmax=381 nm). The OD value indicates the optical density of the optical recording layer formed directly on the substrate, without forming the reflection layer, based on the OD value of the substrate alone being 0.

Thereafter, a protection layer constituted by ZnS—SiO$_2$ was formed to a film thickness of 20 nm by means of sputtering. Then, UV-hardening resin with an elastic modulus of 50 MPa at 25° C. was spin-coated and UV light was irradiated to harden the resin, to form a cover layer (optical transparent layer) of 0.1 mm, and consequently an optical information recording medium was obtained. Elastic modulus was measured using the dynamic visco-elasticity measuring apparatus "RMAIII" (brand name) manufactured by TA Instruments. The sample resin was coated onto a disc to 100 μm and then hardened, after which the resin was separated from the disc and cut into a size of 5 mm×50 mm to obtain a test piece.

Thereafter, the BCA writer "POM-3B" (brand name) manufactured by Hitachi Computer Peripherals was used to perform BCA cutting under the conditions of speed of 2000 rpm, feed pitch of 3 μm, duty of 40% and cutting power of 550 mW (405 nm wavelength). The disc was set in the "ODU-1000" (brand name) manufactured by Pulstec and fed to 21.6 mm with the focus to be maintained at a regeneration power of 0.35 mW and speed of 4.92 m/s, to evaluate the signal quality.

Examples 2 to 32 and Comparative Examples 1 to 25

Optical information recording media were prepared, in the same manner as in Example 1 except that the type of dye and mixing ratio were changed as shown in Tables 4 and 5, and evaluated. The evaluation results are shown in Tables 4 and 5.

TABLE 4

|  | Main dye | Additive dye | Additive ratio [%] | IS/IH | Terminal noise [%] |
| --- | --- | --- | --- | --- | --- |
| Example 1 | Chemical Formula 11 | Chemical Formula 31 | 20 | 0.44 | 20% |
| Example 2 | Chemical Formula 11 | Chemical Formula 32 | 20 | 0.40 | 23% |
| Example 3 | Chemical Formula 11 | Chemical Formula 33 | 20 | 0.46 | 18% |
| Example 4 | Chemical Formula 11 | Chemical Formula 34 | 20 | 0.45 | 20% |
| Example 5 | Chemical Formula 11 | Chemical Formula 35 | 20 | 0.46 | 18% |
| Example 6 | Chemical Formula 11 | Chemical Formula 36 | 20 | 0.46 | 18% |
| Example 7 | Chemical Formula 11 | Chemical Formula 37 | 20 | 0.42 | 21% |
| Example 8 | Chemical Formula 11 | Chemical Formula 38 | 20 | 0.46 | 19% |
| Example 9 | Chemical Formula 11 | Chemical Formula 39 | 20 | 0.46 | 19% |
| Example 10 | Chemical Formula 11 | Chemical Formula 40 | 20 | 0.41 | 23% |
| Example 11 | Chemical Formula 11 | Chemical Formula 41 | 20 | 0.44 | 20% |
| Example 12 | Chemical Formula 11 | Chemical Formula 42 | 20 | 0.39 | 24% |
| Example 13 | Chemical Formula 11 | Chemical Formula 43 | 20 | 0.40 | 24% |
| Example 14 | Chemical Formula 11 | Chemical Formula 31 | 20 | 0.40 | 24% |
| Example 15 | Chemical Formula 11 | Chemical Formula 31 | 20 | 0.49 | 16% |
| Example 16 | Chemical Formula 12 | Chemical Formula 31 | 20 | 0.45 | 20% |
| Example 17 | Chemical Formula 13 | Chemical Formula 31 | 20 | 0.44 | 21% |
| Example 18 | Chemical Formula 14 | Chemical Formula 31 | 20 | 0.43 | 21% |
| Example 19 | Chemical Formula 15 | Chemical Formula 31 | 20 | 0.45 | 20% |
| Example 20 | Chemical Formula 16 | Chemical Formula 31 | 20 | 0.47 | 19% |
| Example 21 | Chemical Formula 17 | Chemical Formula 31 | 20 | 0.44 | 20% |
| Example 22 | Chemical Formula 18 | Chemical Formula 31 | 20 | 0.45 | 20% |
| Example 23 | Chemical Formula 19 | Chemical Formula 31 | 20 | 0.47 | 18% |
| Example 24 | Chemical Formula 20 | Chemical Formula 31 | 20 | 0.47 | 19% |
| Example 25 | Chemical Formula 21 | Chemical Formula 31 | 20 | 0.45 | 21% |
| Example 26 | Chemical Formula 13 | Chemical Formula 32 | 20 | 0.43 | 23% |
| Example 27 | Chemical Formula 15 | Chemical Formula 34 | 20 | 0.43 | 22% |
| Example 28 | Chemical Formula 17 | Chemical Formula 36 | 20 | 0.41 | 24% |
| Example 29 | Chemical Formula 18 | Chemical Formula 39 | 20 | 0.46 | 20% |
| Example 30 | Chemical Formula 19 | Chemical Formula 40 | 20 | 0.49 | 18% |
| Example 31 | Chemical Formula 20 | Chemical Formula 41 | 20 | 0.45 | 20% |
| Example 32 | Chemical Formula 21 | Chemical Formula 42 | 20 | 0.42 | 21% |

TABLE 5

| | Main dye | Additive dye | Additive ratio [%] | IS/IH | Terminal noise [%] |
|---|---|---|---|---|---|
| Comparative Example 1 | Chemical Formula 11 | — | — | 0.37 | 27% |
| Comparative Example 2 | Chemical Formula 12 | — | — | 0.38 | 28% |
| Comparative Example 3 | Chemical Formula 13 | — | — | 0.37 | 29% |
| Comparative Example 4 | Chemical Formula 14 | — | — | 0.36 | 28% |
| Comparative Example 5 | Chemical Formula 15 | — | — | 0.38 | 27% |
| Comparative Example 6 | Chemical Formula 16 | — | — | 0.40 | 26% |
| Comparative Example 7 | Chemical Formula 17 | — | — | 0.37 | 27% |
| Comparative Example 8 | Chemical Formula 18 | — | — | 0.38 | 27% |
| Comparative Example 9 | Chemical Formula 19 | — | — | 0.40 | 26% |
| Comparative Example 10 | Chemical Formula 20 | — | — | 0.40 | 26% |
| Comparative Example 11 | Chemical Formula 21 | — | — | 0.38 | 28% |
| Comparative Example 12 | Chemical Formula 11 | Chemical Formula 31 | 5 | 0.38 | 26% |
| Comparative Example 13 | Chemical Formula 11 | Chemical Formula 31 | 50 | 0.53 | 13% |
| Comparative Example 14 | Chemical Formula 11 | Chemical Formula 51 | 20 | 0.48 | 26% |
| Comparative Example 15 | Chemical Formula 11 | Chemical Formula 52 | 20 | 0.51 | 19% |
| Comparative Example 16 | Chemical Formula 11 | Chemical Formula 53 | 20 | 0.51 | 18% |
| Comparative Example 17 | Chemical Formula 11 | Chemical Formula 54 | 20 | 0.51 | 19% |
| Comparative Example 18 | Chemical Formula 11 | Chemical Formula 55 | 20 | 0.54 | 21% |
| Comparative Example 19 | Chemical Formula 11 | Chemical Formula 56 | 20 | 0.55 | 20% |
| Comparative Example 20 | Chemical Formula 11 | Chemical Formula 57 | 20 | 0.53 | 7% |
| Comparative Example 21 | Chemical Formula 11 | Chemical Formula 58 | 20 | 0.48 | 27% |
| Comparative Example 22 | Chemical Formula 17 | Chemical Formula 51 | 20 | 0.49 | 26% |
| Comparative Example 23 | Chemical Formula 20 | Chemical Formula 53 | 20 | 0.51 | 12% |
| Comparative Example 24 | Chemical Formula 19 | Chemical Formula 55 | 20 | 0.56 | 22% |
| Comparative Example 25 | Chemical Formula 21 | Chemical Formula 58 | 20 | 0.48 | 26% |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-012359, filed Jan. 24, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A recordable optical recording medium comprising a substrate as well as at least a reflection layer, recording layer, and light transmission layer provided on the substrate, wherein the recording layer of said optical recording medium contains (a) an azo metal complex dye and (b) another dye whose DSC decomposition heat value is 50 cal/g to 200 cal/g and λmax in TFP solution is 250 to 400 nm.

2. An optical recording medium according to claim 1, wherein the refractive index (n) and absorption coefficient (k) of dye (b) are 1.6 to 2.0 and 0.20 to 0.70, respectively, for 405 nm wavelength.

3. An optical recording medium according to claim 1, wherein dye (a) is an azo metal complex dye expressed by General Formula (1)

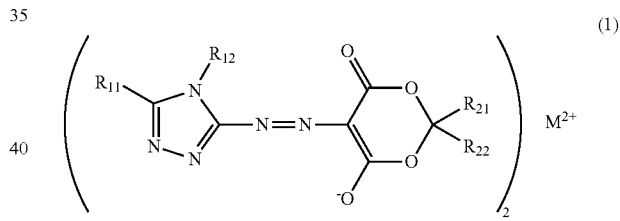

wherein $R_{11}$ and $R_{12}$ are each an independent functional group selected from the group consisting of a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms; $R_{21}$ and $R_{22}$ are each an independent alkyl group with 5 or less carbon atoms, or alternatively $R_{21}$ and $R_{22}$ can together form member ring; M represents a metal atom selected from the group consisting of nickel, cobalt and copper.

4. An optical recording medium according to claim 2, wherein dye (a) is an azo metal complex dye expressed by General Formula (1)

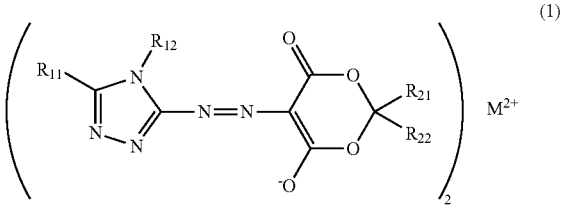

wherein $R_{11}$ and $R_{12}$ are each an independent functional group selected from the group consisting of a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms; $R_{21}$ and $R_{22}$ are each an independent alkyl group with 5 or less carbon atoms, or alternatively $R_{21}$ and $R_{22}$ can together form member ring; M represents a metal atom selected from the group consisting of nickel, cobalt and copper.

5. An optical recording medium according to claim 1, wherein the content of dye (b) in the recording layer is 10 to 40 percent by weight relative to the weight of all organic dye in the recording layer.

6. An optical recording medium according to claim 2, wherein the content of dye (b) in the recording layer is 10 to 40 percent by weight relative to the weight of all organic dye in the recording layer.

7. An optical recording medium according to claim 1, wherein the light transmission layer has a one-layer configuration.

8. An optical recording medium according to claim 2, wherein the light transmission layer has a one-layer configuration.

9. An optical recording medium according to claim 7, wherein the elastic modulus of the light transmission layer at 25° C. is 40 MPa or more, but no more than 10000 MPa.

10. An optical recording medium according to claim 8, wherein the elastic modulus of the light transmission layer at 25° C. is 40 MPa or more, but no more than 10000 MPa.

11. An optical recording medium according to claim 1, wherein a protection layer formed with dielectric material is provided between the recording layer and light transmission layer.

12. An optical recording medium according to claim 2, wherein a protection layer formed with dielectric material is provided between the recording layer and light transmission layer.

13. An optical recording medium according to claim 11, wherein a hardcoat layer is formed on the surface of the light transmission layer on the side opposite the one where the protection layer is formed.

14. An optical recording medium according to claim 12, wherein a hardcoat layer is formed on the surface of the light transmission layer on the side opposite the one where the protection layer is formed.

* * * * *